United States Patent
Chheda et al.

(10) Patent No.: US 10,019,344 B1
(45) Date of Patent: Jul. 10, 2018

(54) COMPUTER IMPLEMENTED SYSTEM AND METHOD AND COMPUTER PROGRAM PRODUCT FOR A TEST FRAMEWORK FOR ORCHESTRATION WORKFLOWS

(71) Applicant: VCE Company, LLC, Richardson, TX (US)

(72) Inventors: Nilay B Chheda, San Jose, CA (US); Vandana Rao, San Jose, CA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 160 days.

(21) Appl. No.: 14/841,145

(22) Filed: Aug. 31, 2015

(51) Int. Cl.
*G06F 9/44* (2018.01)
*G06F 11/36* (2006.01)

(52) U.S. Cl.
CPC ...... *G06F 11/3664* (2013.01); *G06F 11/3688* (2013.01); *G06F 11/3692* (2013.01); *G06F 11/3696* (2013.01); *G06F 11/3668* (2013.01); *G06F 11/3672* (2013.01); *G06F 11/3684* (2013.01)

(58) Field of Classification Search
CPC ............. G06F 11/3688; G06F 11/3684; G06F 11/3696; G06F 11/3668; G06F 11/3672; G06F 11/368; G06F 8/10; G06F 8/71; G06F 2201/865
See application file for complete search history.

(56) References Cited

U.S. PATENT DOCUMENTS

| 9,170,821 | B1* | 10/2015 | Palaniappan | G06F 9/44 |
| 2005/0144593 | A1* | 6/2005 | Raghuvir | G06F 11/3688 717/124 |
| 2006/0179422 | A1* | 8/2006 | Gortler | G06F 11/3688 717/124 |
| 2010/0153482 | A1* | 6/2010 | Kim | G06F 8/61 709/201 |

(Continued)

OTHER PUBLICATIONS

Tranois et al., A workflow on the dynamic composition and distribution of orchestration for testbed provisioning, Oct. 2009, 6 pages.*

*Primary Examiner* — Lewis A Bullock, Jr.
*Assistant Examiner* — Tina Huynh
(74) *Attorney, Agent, or Firm* — Womble Bond Dickinson (US) LLP

(57) ABSTRACT

A system, method and computer program product for a test framework for orchestration workflows. For example, a method in accordance with some embodiments includes accessing a workflow test function library comprised of a plurality of workflow test functions. A workflow test function is a function that tests an orchestration workflow component. A plurality of workflow test suites may be accessed, each of which is comprised of one or more workflow tests. A workflow test hook is inserted into a target orchestration workflow component. The inserted workflow test hook is associated with at least one of the plurality of workflow test suites. The inserted workflow test hook is invoked thereby causing each of workflow tests to be (Continued)

performed on the target workflow test component. Target orchestration workflow component test result information is received from the target orchestration workflow component and the target workflow component test result information is outputted.

12 Claims, 5 Drawing Sheets

(56) References Cited

U.S. PATENT DOCUMENTS

| | | | |
|---|---|---|---|
| 2012/0331150 A1* | 12/2012 | Rao .................. | G06F 9/5038 709/226 |
| 2013/0297973 A1* | 11/2013 | Hyland ............... | G06F 11/28 714/27 |
| 2016/0004622 A1* | 1/2016 | Kaulgud ............ | G06F 11/3684 717/132 |

\* cited by examiner

COMPUTER IMPLEMENTED SYSTEM AND METHOD AND COMPUTER PROGRAM PRODUCT FOR A TEST FRAMEWORK FOR ORCHESTRATION WORKFLOWS

FIELD OF THE DISCLOSURE

Aspects of the disclosure relate to computing technology and, more particularly, to a system, method, and computer program product for providing a test framework for orchestration workflows.

BACKGROUND

An orchestration workflow defines a logical flow of functions or steps. Orchestration workflows managed by orchestration engines such as VMware™ vRealize Orchestrator (vRO), which is available from VMware Inc. of Palo Alto, Calif., and Microsoft Windows™ Workflow Foundation, which is available from Microsoft Corporation of Redmond, Wash., include a starting point, an end point and function blocks or steps in between. Each function block has inputs, outputs and coding logic. In addition, information is passed among the function blocks. A disadvantage of such orchestrators, however, is that they have limited testing capabilities. While conventional orchestration engines allow for testing of an entire workflow, they cannot test components of an orchestration workflow, such as a single functional step, or even a block of source code within a functional step. What is needed, therefore, is a system and method for testing an orchestration workflow that does not have the limitations of the know systems and method for doing so.

SUMMARY

A system, method, and computer program product for providing a test framework for orchestration workflows. For example, a method in accordance with some embodiments may include accessing a workflow test function library that is comprised of a plurality of workflow test functions. A workflow test function is a function that tests an orchestration workflow component. The method also may include accessing a plurality of workflow test suites, each of which is comprised of one or more workflow tests. A workflow test hook is inserted into a target orchestration workflow component, which is an orchestration workflow component to be tested. The method also may associate the inserted workflow test hook with at least one of the plurality of workflow test suites. The inserted workflow test hook may be invoked thereby causing each of workflow tests comprising the workflow test suite associated with the invoked workflow test hook to be performed on the target workflow test component. Target orchestration workflow component test result information may be received from the target orchestration workflow component. The target orchestration workflow component test result information is comprised of information indicating results of performing each of the one or more workflow tests on the target workflow component. The method may then output target workflow component test result information.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Workflows are becoming an increasingly popular method of infrastructure management. This is primarily because workflows are easier to maintain, easier to understand, and provide a visual flow to non-technical users. A user can develop a workflow using a workflow design tool, such as is available in the VMware™ vRO. To design a workflow, the user drags and drops various symbols and connects the symbols with arrows in some embodiments. Generally, a workflow embodies a service fulfillment process. One example would be a workflow that instantiates and deploys a virtual application. Further examples include commissioning a virtual local area network, provisioning a virtual machine, decommissioning a virtual machine, among others.

Figure 1:
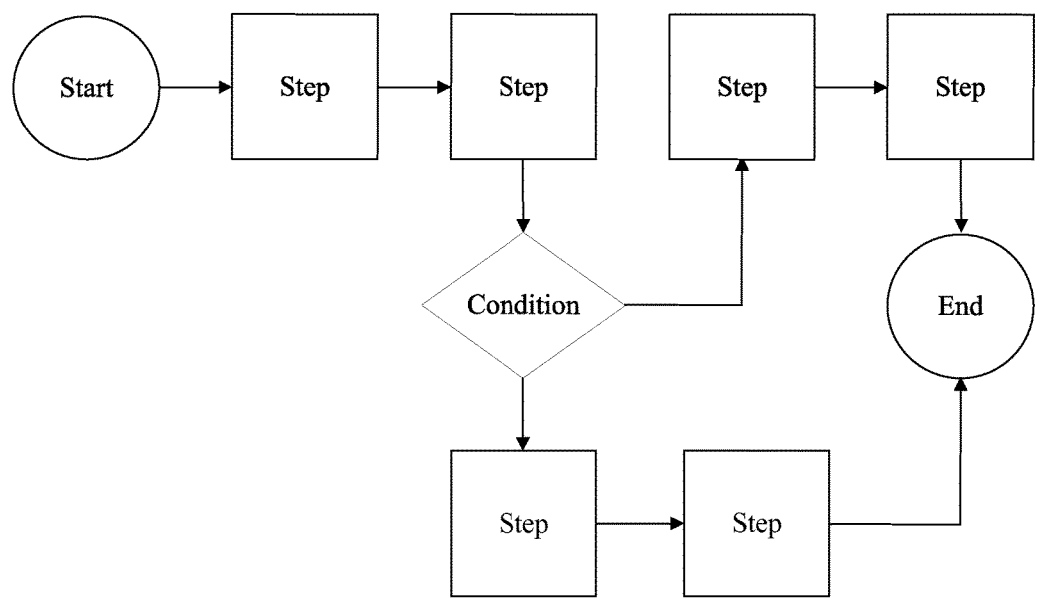
FIG. 1 is an example of a workflow in accordance with some embodiments.

FIG. 1 is an example of an orchestration workflow 100. Referring to FIG. 1, workflow 100 defines a logical flow of activities or tasks from a start event to an end event that is designed to accomplish a specific service. The start event initiates the flow of events or steps that are part of workflow 100. As may be appreciated, each workflow step may be comprised of one or more code blocks, each of which may perform a discrete operation or function. As shown in FIG. 1, advancement from steps can involve meeting certain conditions. Whether the condition or conditions are met can determine the path of workflow 100 that is taken from the start event to the end event.

In some embodiments, workflow elements are accessed from a library of workflow elements. Thus, many types of workflows that can include various symbols are possible. FIG. 1 is one example of such types of workflows and is not meant to be limiting. The workflow elements that are used to create a workflow may be customized by a user through plug-ins or customizable building blocks.

Figure 2:
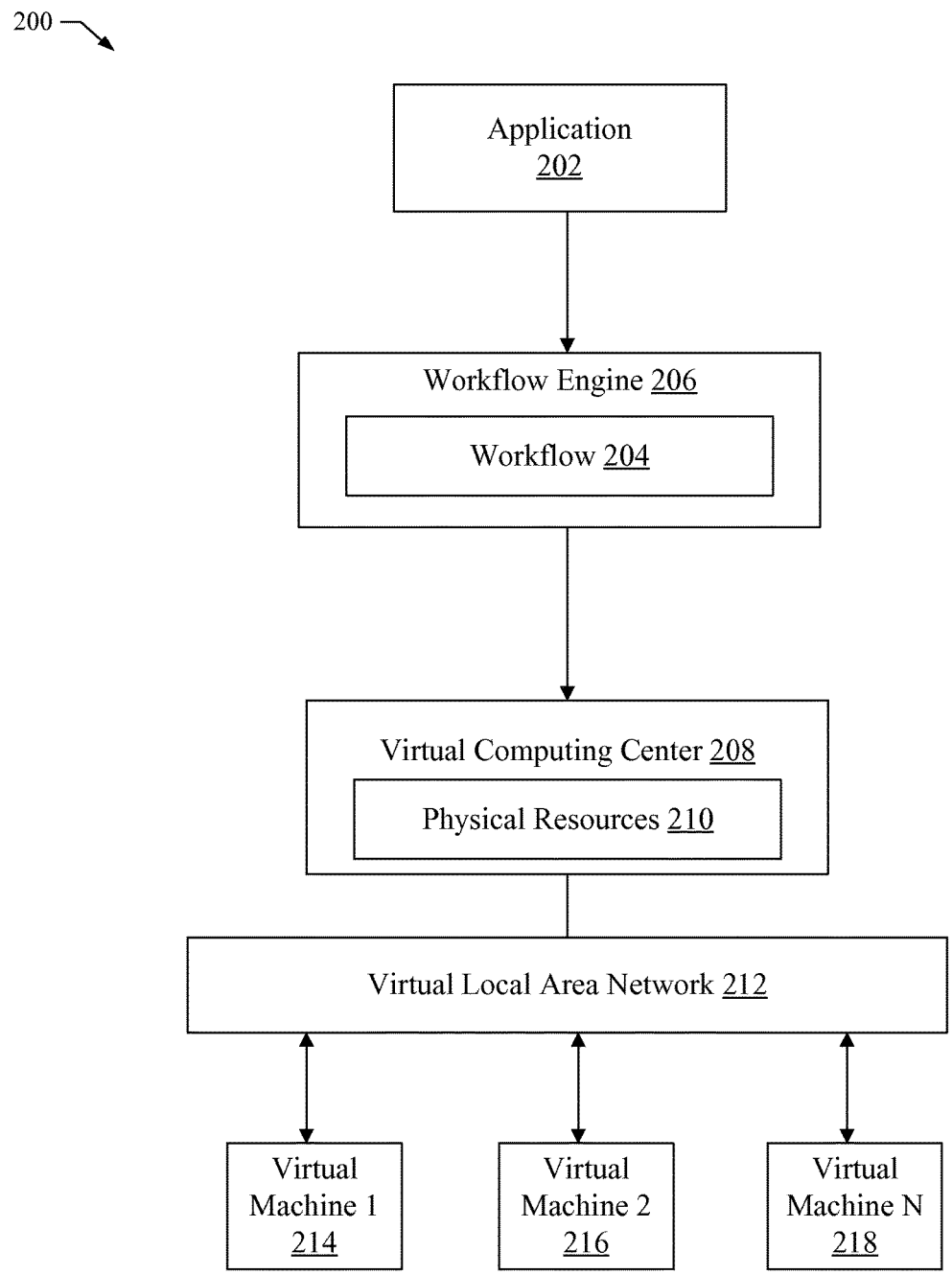
FIG. 2 is a block diagram illustrating an application invoking an orchestration workflow to execute on an orchestration workflow engine, in accordance with some embodiments.

FIG. 2 is a block diagram illustrating an application 202 invoking an orchestration workflow 204 to execute on an orchestration workflow engine 206, in accordance with some embodiments. Application 202 can be implemented as a layer of software that handles workflow execution requests. Physically, application 202 can be implemented in a computer coupled to virtual computing center 208, or can be included in physical resources 210 of a virtual computing center 208, for example as software executing on a processor thereof. Workflow 204 could, for example, commission, provision or decommission one or more virtual machines 214, 216 and 218, a virtual local area network (VLAN) 212, or other virtual or physical arrangement of the physical resources 210 available from the virtual computing center 208, as a service fulfillment process, for example. In some example embodiments, application 202 and workflow engine 206 are implemented on the same server, which could be a physical computing resource or a virtual server implemented on physical computing resources. In other example embodiments, application 202 and workflow engine 206 are implemented on different physical computing resources.

Still referring to FIG. 2, application 202 may generate a user interface for workflow inputs. This user interface can be in the form of HTML (hypertext markup language). Application 202 accepts user inputs, validates the user inputs, and forwards the request to the workflow 204 resident in a workflow engine 206. Workflow engine 206 may be implemented on a virtual or physical computing device, e.g., a virtual server or a physical server, etc. Workflow 204 executes within work flow engine 206 and allocates physical resources 210 in virtual computing center 208. This execution allocates one or more virtual machines 214, 216, 218 and virtual local area network 212, in some embodiments. Application 202 processes a response of the workflow 204, and determines whether to send the response to a portal which initiated the workflow 204, or to retry or restart the workflow 204. Since application 202 may be a common interface for all workflow execution requests, functionality such as logging, tracing and exception handling can be handled centrally by application 202, rather than having these functions handled by portals.

Figure 3:
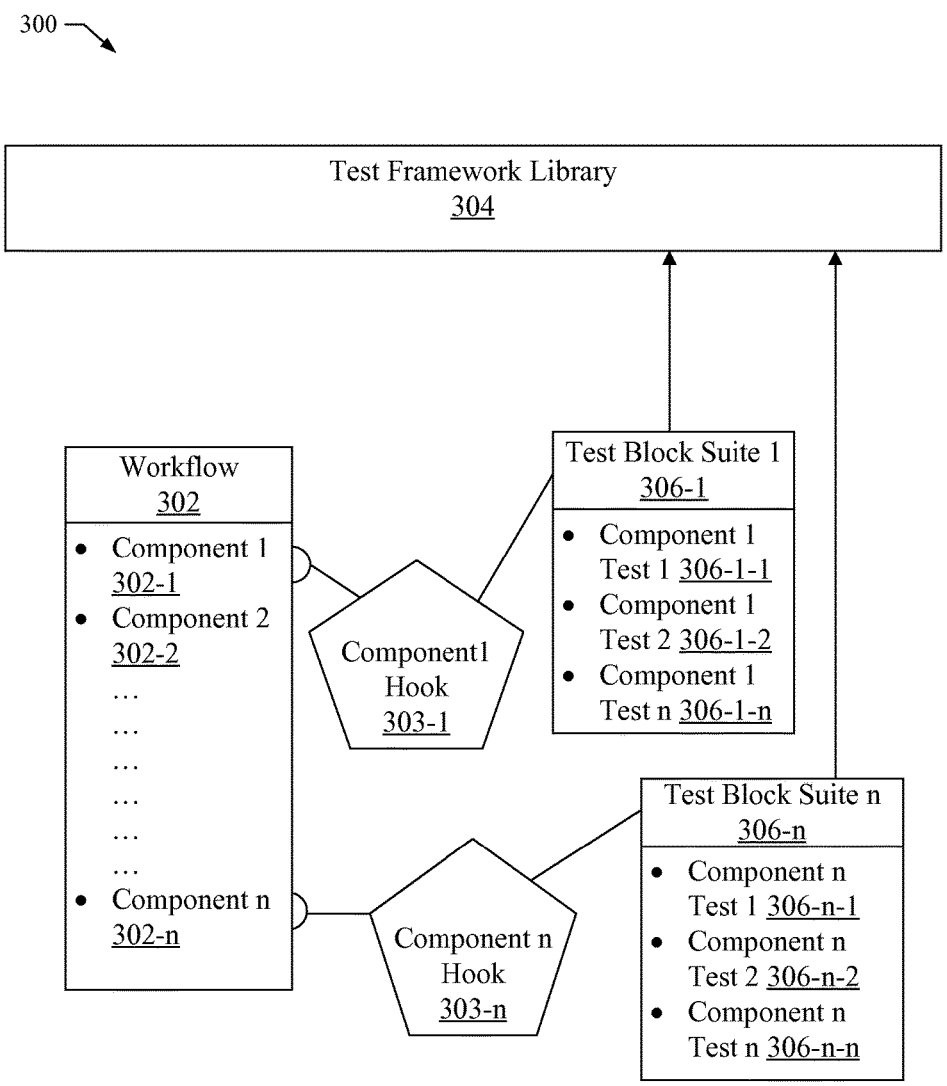
FIG. 3 is a block diagram illustrating a test framework for orchestration workflows, in accordance with some embodiments.

FIG. 3 is a block diagram illustrating a software framework 300 for testing a component of orchestration workflow 302, in accordance with some embodiments. A software framework is a technique for managing the complexity of computer system in which software providing generic functionality can be selectively changed and/or extended by additional user-written code, thus providing application-specific software. A sample embodiment of the software framework 300 is illustrated in more detail in FIG. 3.

As shown by FIG. 3, framework 300 may include a test framework library 304 and one or more test block suites 306-1 to 306-n. Each test block suite may include one or more tests for an orchestration workflow component, which are discussed in more detail below.

Continuing with FIG. 3, and as discussed above, a workflow 302 may be comprised of a plurality of workflow components. A workflow component may include one or more workflow steps 302-1 to 302-n. A workflow component also may include one or more code blocks of a workflow step.

Still referring to FIG. 3, one or more target workflow component hooks may be inserted into workflow 302 in order to test a target workflow component. As may be appreciated, a hook is a function that allows for the invocation of a test function in an orchestration workflow. In the sample embodiment illustrated in FIG. 3, target workflow component hook 303-1 points to test block suite 306-1 and target workflow component hook 303-n points to test block suite 306-n.

In some sample embodiments, the target workflow component may be an orchestration workflow step and the target workflow component hook may be a link that precedes the orchestration workflow step to be tested. Thus, during execution of the orchestration workflow to be tested, target workflow component hook will cause the test functions comprising the test block suite, to which the target workflow component is linked, to be performed on the target workflow component.

Referring to FIG. 3, target workflow component hook 303-1 is inserted before step 302-1, which is the target workflow component. Similarly, target workflow component hook 303-n is inserted at step 302-n. As also shown in FIG. 3, target workflow component hook 303-1 links step 302-1 with test block suite 306-1, and target workflow component hook 303-n links step 302-n with test block suite 306-n. Thus, upon execution of orchestration workflow 302, when target workflow component hook 303-1 is processed, the hook 303-1 causes test functions 306-1-1 to 306-1-n of test block suite 306-1 to be executed. Similarly, when target workflow component hook 303-n is processed, the hook 303-n causes test functions 306-n-1 to 306-n-n to be executed.

While the target workflow components illustrated in FIG. 3 are workflow steps, in some sample embodiments, a target workflow component may be one or more code blocks comprising a flat script, such as a JavaScript. In such embodiments, the target workflow component hook may be implemented using annotations. As may be appreciated, an annotation, in the Java computer programming language, is a form of syntactic metadata that can be added to Java source code. Example annotations are as follows:

@TestBlockSuite(name="sampleTBS", block="start"). This annotation, which functions as a "start tag," introduces a test block suite by name, i.e., "sampleTBS." The annotation also indicates the starting point of a code block to be tested.

@TestBlockSuite(name="sampleTBS", block="end"). This annotation, which functions as an "end tag," marks the end of block of code to be tested by test block suite sampleTBS.

As may be appreciated, upon execution of test block suite sampleTBS, the code block between start tag and end tag is tested recursively by the test functions defined by test block suite sampleTBS. In some example embodiments, because some scripting languages (e.g., JavaScript) do not support the concept of annotations, the annotations must be enclosed in comments and the compiler must be made aware of the syntax for such annotations.

Workflow framework 300 also may include a test framework library 304. Test framework library 304 may include functions that will utilized by the tests. Example functions may include assertions, errors, failures, etc.

Referring to FIG. 3, workflow framework 300 also may include one or more test block suites 306-1 to 306-n. Each test block suite contains a list of tests that need to be performed at a specific target workflow component hook location. In some example embodiments, a test is a function, which may be defined by a user, and which tests a specific orchestration workflow component. As may be appreciated, a test function receives one or more parameters but does not, however, return a value. In some example embodiments, each test function will perform the following steps:

a) Prepare—the test function prepares the environment that is necessary for the code block;

b) Execute—the test function executes the orchestration workflow component (e.g., step, code block, etc.) that needs to be tested;

c) Verify—the test function verifies the output of the orchestration workflow component to be tested against known values; and d) Rollback—the test functions rolls back/updates the environment the state it was in before the start of the test.

Figure 4:
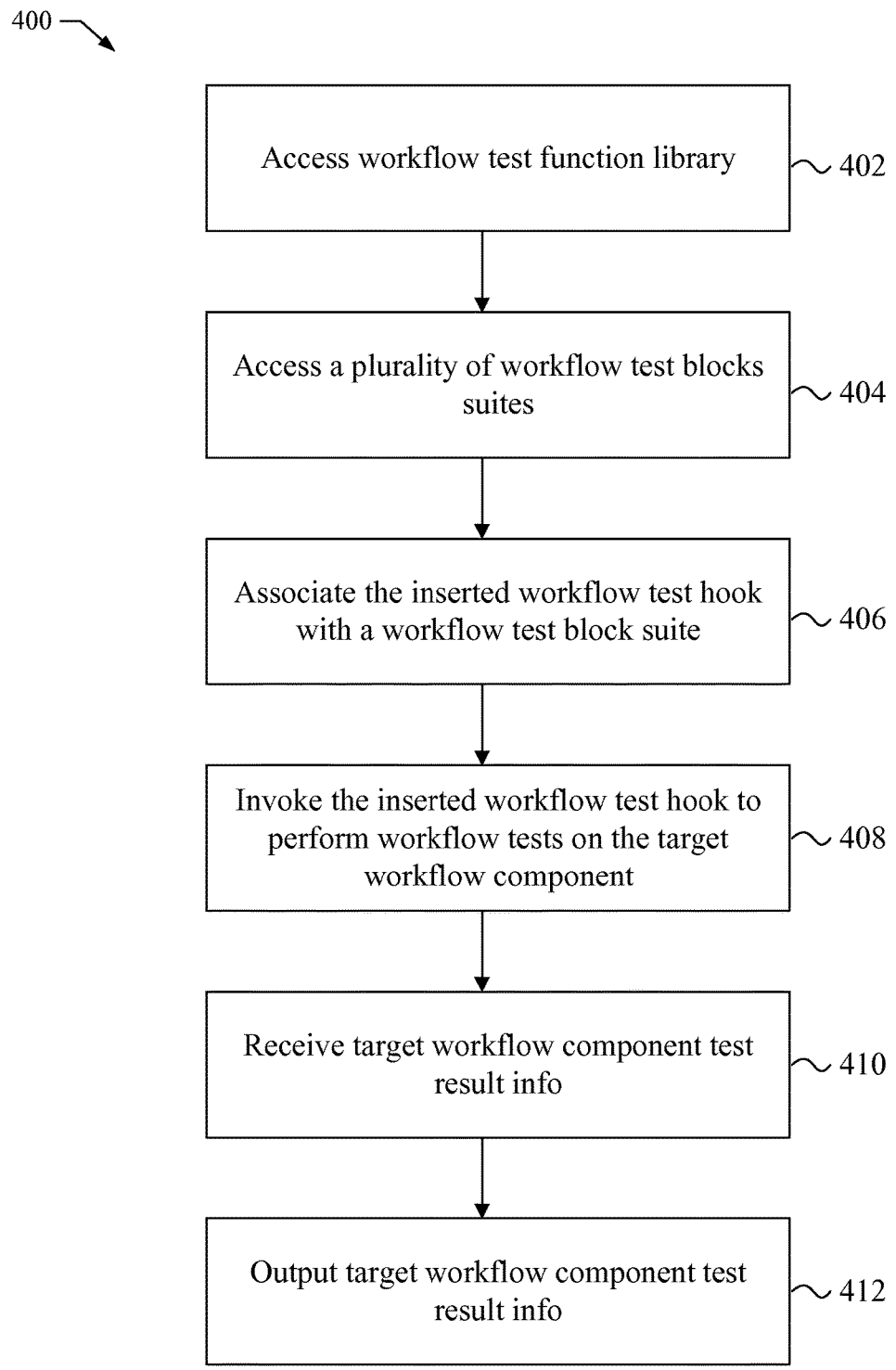
FIG. 4 illustrates a process flow diagram for a test framework for orchestration workflows, in accordance with some embodiments.

FIG. 4 illustrates a flow diagram for a process 400 for a test framework for orchestration workflows, in accordance with some example embodiments. As shown in FIG. 4, in operation 402, process 400 accesses a workflow test function library. The workflow test function library is comprised of a plurality of workflow test functions, and a workflow test function is a function that tests an orchestration workflow component. An orchestration workflow component may be an orchestration workflow step or a block of code of an orchestration workflow step.

In operation 404, process 400 may access a plurality of workflow test blocks suites. A workflow test block suite is comprised of a plurality of workflow test functions and each of the workflow test block suite is associated with an orchestration workflow component.

In operation 406, process 400 may insert a workflow test hook into a target orchestration workflow component, which is an orchestration workflow component to be tested.

In operation 408, process 400 may invoke the inserted workflow test hook. Invoking the inserted workflow test hook may cause each of the one or more workflow tests, which comprise the workflow test suite associated with the invoked workflow test hook, to be performed on the target workflow test component.

In operation 410, process 400 receives target orchestration workflow component test result information from the target orchestration workflow component. The target orchestration workflow component test result information is comprised of information indicating results of invoking the inserted workflow test hook and performing the workflow test on the target orchestration workflow component.

In operation 412, process 400 outputs the target workflow component test result information.

Figure 5:
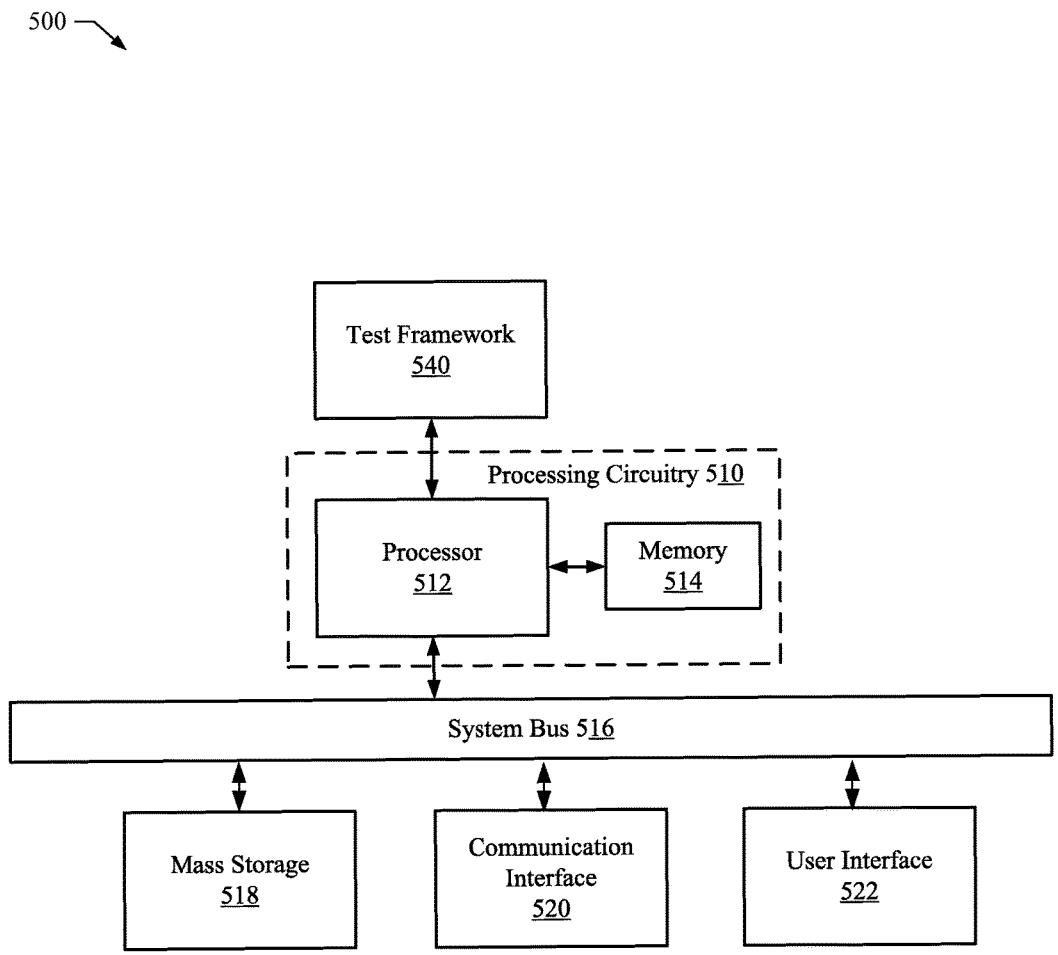
FIG. 5 is a block diagram illustrating an exemplary computing device which may implement the embodiments described herein.

FIG. 5 is a diagram of an example computing system 500 that may be used to implement some example embodiments of a test framework for orchestration workflows. The computing system 500 may be implemented on any computing device or plurality of computing devices that may be configured to implement one or more example embodiments.

By way of non-limiting example, in some embodiments, the computing system 500 may be implemented on a user terminal and/or a computing platform(s) of a converged infrastructure.

The computing system may include a plurality of elements, such as processing circuitry 510, mass storage 518, communication interface 520, and user interface 522, which may be interfaced via a system bus 516. It will be appreciated that the components, devices or elements illustrated in and described with respect to FIG. 5 below may not be mandatory and thus some may be omitted in certain embodiments. Additionally, the computing system 500 of some embodiments may include further or different components, devices or elements beyond those illustrated in and described with respect to FIG. 5.

Further, while FIG. 5 illustrates an architecture including elements interfaced via the system bus 516, it will be appreciated that in some example embodiments, elements of the computing system 500 may be implemented in a distributed computing environment in which elements may be distributed across a plurality of computing devices, which may be in communication with each other, such as via a network, to provide functionality of the computing system 500. As such, in some example embodiments, elements of the computing system 500 may be communicatively coupled via a network in addition to or in lieu of the system bus 516.

The computing system 500 of some example embodiments may implement an operating system(s), such as MICROSOFT WINDOWS™, UNIX™, LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating systems. It should be appreciated; however, that in some embodiments, one or more aspects of the computing system 500 may be implemented on and/or integrated with a virtualized computing system, such as may be provided by a converged infrastructure.

In some example embodiments, the computing system 500 may include processing circuitry 510 that is configurable to perform actions in accordance with one or more example embodiments disclosed herein. In this regard, the processing circuitry 510 may be configured to perform and/or control performance of one or more functionalities for determining a configuration of a converged infrastructure, such as converged infrastructure, in accordance with various example embodiments. Thus, the processing circuitry 510 may be configured to perform data processing, application execution and/or other processing and management services according to one or more example embodiments.

In some example embodiments, the processing circuitry 510 may include a processor 512 and, in some embodiments, such as that illustrated in FIG. 5, may further include memory 514. The processing circuitry 510 may be in communication with (e.g., via system bus 516) and/or otherwise control mass storage 518, communication interface 520, and/or user interface 522.

The processor 512 may be embodied in a variety of forms. For example, the processor 512 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 512 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 500 is embodied as a plurality of computing devices, a plurality of processors, which may collectively form the processor 512, may be distributed across a plurality of computing devices that may be in operative communication with each other directly and/or via a network. In some example embodiments, the processor 512 may be configured to execute instructions that may be stored in a memory, such as the memory 514 and/or the mass storage 518 and/or that may be otherwise accessible to the processor 512. As such, whether configured by hardware or by a combination of hardware and software, the processor 512 may be capable of performing operations according to various embodiments while configured accordingly.

In embodiments including the memory 514, the memory 514 may include read only memory (ROM), random access memory (RAM), and/or the like. The mass storage 518 may include one or more memory and/or other storage devices, which may include fixed (e.g., a fixed hard disc drive, storage array, fixed flash memory device, and/or the like) and/or removable memory devices (e.g., a removable flash memory device, an optical disc drive, and/or other removable memory device). The mass storage 518 may provide a persistent data storage device. In some example embodiments, the mass storage 518 may be configured to provide a backup storage. The mass storage 518 may include a memory device implemented locally to the computing system 500 and/or a memory device remote to the computing system 500, which may be communicatively coupled with the computing system 500, such as via a network. In some embodiments in which the computing system 500 is embodied as a plurality of computing devices, the memory 514 and/or mass storage 518 may include a plurality of memory devices, which may be distributed across a plurality of computing devices that may be in operative communication with each other directly and/or via a network to form the computing system 500.

In some embodiments, the memory 514 and/or the mass storage 518 may provide a non-transitory computer-readable storage medium that may store computer program instructions that may be executed by the processor 512. In this regard, the memory 514 and/or mass storage 518 may be configured to store information, data, applications, instructions and/or the like for enabling the computing system 500 to carry out various functions in accordance with one or more example embodiments. Applications that may be executed by the processor 512 may also be in the form of modulated electronic signals that may be accessed via a network modem or other network interface of the computing system 500.

The computing system 500 may further include a communication interface 520. The communication interface 520 may enable the computing system 500 to communicate (e.g., over a network or other communication interface) with another computing device or system, such as the converged infrastructure. In this regard, the communication interface 520 may include one or more interface mechanisms for enabling communication with other devices and/or networks. As such, the communication interface 520 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 500 may include the user interface 522. It will be appreciated, however, that in some example embodiments, one or more aspects of the user interface 522 may be omitted, and in some embodiments, the user interface 522 may be omitted entirely. The user interface 522 may be in communication with the processing circuitry 510 to receive an indication of a user input and/or to provide an audible, visual, mechanical, or other output to a user. As such, the user interface 522 may include, for example, a keyboard, a mouse, a joystick, a display, a touch screen display, a microphone, a speaker, one or more biometric input devices, and/or other input/output mechanisms.

As shown in FIG. 5, in some example embodiments, a test framework for orchestration workflows 540 interfaces with computing system 500. As discussed above in connection with FIG. 2, the test framework for orchestration workflows 540 may be configured to facilitate the testing of an orchestration workflow component.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, mini computers, mainframe computers and the like. Some embodiments may also be practiced in distributed computing environments where tasks are performed by remote processing devices that are linked through one or more networks, such as one or more wireline networks and/or one or more wireless networks.

A computer program product may be used to implement a test framework for orchestration workflows, in some example embodiments. A computer program product embodiment may include a machine-readable, non-transitory (non-volatile) storage medium (media) having instructions stored thereon/in, which can be used to program a computer to perform any of the processes of the embodiments described herein. Computer code for operating and configuring a test framework for orchestration workflows is preferably downloaded and stored on a hard disk, although the entire program code, or portions thereof, may also be stored in any other volatile or non-volatile memory medium or device as is well known, such as a read only memory (ROM) or random access memory (RAM), or provided on any media capable of storing program code, such as any type of rotating or solid state media, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), local area network (LAN), etc.) using any communication medium and protocols (e.g., transmission control protocol/internet protocol (TCP/IP), hypertext transport protocol (HTTP), HTTP secure (HTTPS), Ethernet, etc.) as are well known. It may be appreciated that computer code for implementing embodiments of the present invention can be implemented in any programming language that can be executed on a client system and/or server or server system such as, for example, C, C++, hypertext markup language (HTML), any other markup language, Java™, JavaScript, ActiveX, any other scripting language, such as VBScript, and many other programming languages as are well known may be used.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A computer implemented method for providing a framework for testing an orchestration workflow component, the method comprising:
   accessing a workflow test function library, the workflow test function library is comprised of a plurality of workflow test functions, wherein a workflow test function is a function that tests an orchestration workflow component;
   accessing a plurality of workflow test suites, wherein each of the plurality of workflow test suites is comprised of one or more workflow tests selected from the group consisting of valid output, null output and invalid output;
   inserting a workflow test hook into a target orchestration workflow component, wherein the target orchestration workflow component is an orchestration workflow component to be tested;
   associating the inserted workflow test hook with at least one of the plurality of workflow test suites;
   invoking the inserted workflow test hook thereby causing each of the one or more workflow tests comprising the workflow test suite associated with the invoked workflow test hook to be performed on the target workflow test component;
   receiving target orchestration workflow component test result information from the target orchestration workflow component, wherein the target orchestration workflow component test result information is comprised of information indicating results of performing each of the one or more workflow tests on the target workflow component;
   restoring a workflow deployment environment to a pre-workflow test state, wherein the pre-workflow test state is a state of the workflow test environment prior to invoking the inserted workflow test hook; and
   outputting target workflow component test result information.

2. The method of claim 1, further comprising:
   verifying output received from the target orchestration workflow component by comparing the received output with a known result.

3. The method of claim 1, wherein the target workflow component is comprised of one or more target workflow source code blocks.

4. The method of claim 3, further comprising:
   identifying at least one of the one or more target workflow source code blocks by identifying a start point of the at least one of the one or more target workflow source code block to be tested and an end point of the at least one of the one or more target workflow source code block to be tested.

5. A computer implemented system for providing a testing framework for testing an orchestration workflow component, the system comprising:
   at least one processor; and
   at least one memory storing computer program code, wherein the at least one memory and stored computer program code are configured, with the at least one processor, to cause the system to at least:
   access a workflow test function library, the workflow test function library is comprised of a plurality of workflow test functions, wherein a workflow test function is a is a function that tests an orchestration workflow component;
   access a plurality of workflow test suites, wherein each of the plurality of workflow test suites is comprised of one or more workflow tests selected from the group consisting of valid output, null output and invalid output;
   insert a workflow test hook into a target orchestration workflow component, wherein the target orchestration workflow component is an orchestration workflow component to be tested;
   associate the inserted workflow test hook with at least one of the plurality of workflow test suites;
   invoke the inserted workflow test hook thereby causing each of the one or more workflow tests comprising the workflow test suite associated with the invoked workflow test hook to be performed on the target workflow test component;

receive target orchestration workflow component test result information from the target orchestration workflow component, wherein the target orchestration workflow component test result information is comprised of information indicating results of performing each of the one or more workflow tests on the target workflow component;

restore a workflow deployment environment to a pre-workflow test state, wherein the pre-workflow test state is a state of the workflow test environment prior to invoking the inserted workflow test hook; and output target workflow component test result information.

6. The system of claim 5, wherein the at least one memory and stored computer program code are configured, with the at least one processor, to further cause the system to:

verify output received from the target orchestration workflow component by comparing the received output with a known result.

7. The system of claim 5, wherein the target workflow component is comprised of one or more target workflow source code blocks.

8. The system of claim 7, wherein the at least one memory and stored computer program code are configured, with the at least one processor, to further cause the system to:

identify at least one of the one or more target workflow source code blocks by identifying a start point of the at least one of the one or more target workflow source code block to be tested and an end point of the at least one of the one or more target workflow source code block to be tested.

9. A computer program product for providing a testing framework for testing an orchestration workflow component, the computer program product comprising at least one non-transitory computer-readable storage medium having program instructions stored thereon, which when executed by at least one processor, cause the at least one processor to perform a method comprising:

accessing a workflow test function library, the workflow test function library is comprised of a plurality of workflow test functions, wherein a workflow test function is a is a function that tests an orchestration workflow component;

accessing a plurality of workflow test suites, wherein each of the plurality of workflow test suites is comprised of one or more workflow tests selected from the group consisting of valid output, null output and invalid output;

inserting a workflow test hook into a target orchestration workflow component, wherein the target orchestration workflow component is an orchestration workflow component to be tested;

associating the inserted workflow test hook with at least one of the plurality of workflow test suites;

invoking the inserted workflow test hook thereby causing each of the one or more workflow tests comprising the workflow test suite associated with the invoked workflow test hook to be performed on the target workflow test component;

receiving target orchestration workflow component test result information from the target orchestration workflow component, wherein the target orchestration workflow component test result information is comprised of information indicating results of performing each of the one or more workflow tests on the target workflow component;

restoring a workflow deployment environment to a pre-workflow test state, wherein the pre-workflow test state is a state of the workflow test environment prior to invoking the inserted workflow test hook; and outputting target workflow component test result information.

10. The computer program product of claim 9, wherein the least one non-transitory computer-readable storage medium having program instructions stored thereon, which when executed by the at least one processor, cause the at least one processor to perform a method further comprising:

verifying output received from the target orchestration workflow component by comparing the received output with a known result.

11. The computer program product of claim 9, wherein the target workflow component is comprised of one or more target workflow source code blocks.

12. The computer program product of claim 11, wherein the least one non-transitory computer-readable storage medium having program instructions stored thereon, which when executed by the at least one processor, cause the at least one processor to perform a method further comprising:

identifying at least one of the one or more target workflow source code blocks by identifying a start point of the at least one of the one or more target workflow source code block to be tested and an end point of the at least one of the one or more target workflow source code block to be tested.

* * * * *